US006757274B1

(12) United States Patent
Bedingfield et al.

(10) Patent No.: US 6,757,274 B1
(45) Date of Patent: Jun. 29, 2004

(54) METHOD AND APPARATUS FOR ALLOWING SELECTIVE DISPOSITION OF AN INCOMING TELEPHONE CALL DURING AN INTERNET SESSION

(75) Inventors: James Carl Bedingfield, Lilburn, GA (US); Robert A. Koch, Norcross, GA (US); Alexander David Raji, Atlanta, GA (US)

(73) Assignee: BellSouth Intellectual Property Corporation

( * ) Notice: Subject to any disclaimer, the term of this patent is extended or adjusted under 35 U.S.C. 154(b) by 0 days.

(21) Appl. No.: 08/991,079

(22) Filed: Dec. 16, 1997

(51) Int. Cl.[7] .................................................. H04L 12/66
(52) U.S. Cl. .......................................................... 370/352
(58) Field of Search ................................. 370/352, 353, 370/354, 355, 356, 357, 360, 400, 401, 410; 379/90.01, 93.01, 93.05, 93.09, 100.15, 100.16, 215, 216, 217, 218, 215.01, 216.01, 217.01, 218.01, 218.02

(56) References Cited

U.S. PATENT DOCUMENTS

| | | | | |
|---|---|---|---|---|
| 5,724,412 A | * | 3/1998 | Srinivasan | 379/93.23 |
| 5,805,587 A | * | 9/1998 | Norris et al. | 370/352 |
| 5,896,444 A | * | 4/1999 | Perlman et al. | 379/93.35 |
| 5,949,763 A | * | 9/1999 | Lund | 370/261 |
| 5,956,391 A | * | 9/1999 | Melen et al. | 379/114.01 |
| 5,982,774 A | * | 11/1999 | Foladare et al. | 370/401 |
| 5,999,612 A | * | 12/1999 | Dunn et al. | 379/212 |
| 6,028,917 A | * | 2/2000 | Creamer et al. | 379/100.01 |
| 6,067,353 A | * | 5/2000 | Szeliga | 379/93.35 |
| 6,078,581 A | * | 6/2000 | Shtivelman et al. | 370/352 |
| 6,125,126 A | * | 9/2000 | Hallenstål | 370/522 |
| 6,198,738 B1 | * | 3/2001 | Chang et al. | 370/352 |

FOREIGN PATENT DOCUMENTS

| | | |
|---|---|---|
| WO | WO 97 22209 | 6/1997 |
| WO | WO 97 26749 | 7/1997 |
| WO | WO 97 47118 | 12/1997 |
| WO | WO 98/01985 | 1/1998 |

OTHER PUBLICATIONS

"Did someone just call you? (How would you know?) Get the Free Internet Answering Machine," CallWave, Inc. website page, Mar. 3, 2000.

"Did someone just call you? Free Internet Answering Machine," CallWave, Inc. website page, Mar. 3, 2000.

"Customer Care, Internet Answering Machine User Guide," CallWave, Inc. website pp. 1–4, Mar. 3, 2000.

"Company Info, About Us," CallWave, Inc. website page, Mar. 3, 2000.

"Kiss your second line goodbye," America's Network website pp. 1–2, (CallWave, Inc.), Feb. 1, 2000.

(List continued on next page.)

Primary Examiner—Kwang Bin Yao
(74) Attorney, Agent, or Firm—Kilpatrick Stockton LLP

(57) ABSTRACT

A method for notifying an internet browser user of an incoming telephone call is performed by internet call notification software residing on the user's computer and software residing within a telephone network. A user selects the location of the internet notification software as a home page for the browser. The home page prompts the user for activation of internet call notification. If the user requests internet call notification, the software transmits an internet protocol address to the telephone network. The network then stores the internet protocol address for the user. When a call is made to the user, the telephone network accesses a database to retrieve the stored internet protocol address. The network then transmits a message to the user's software to notify the user of the incoming call. The software displays a window containing information about the telephone call. If the user chooses to accept the call, the software closes the browser and connects the telephone call to the user.

34 Claims, 5 Drawing Sheets

OTHER PUBLICATIONS

"Heard on the Beat: Technology: Call Waiting? PC Will Deliver Message," Los Angeles Times Find website page, (CallWave, Inc.), Oct. 4, 1999.

"pagoo™ The answer to missed calls while you're online.™ Are you missing phone calls while you're online?," Pagoo.com, Inc. website page, Mar. 3, 2000.

"pagoo™ The answer to missed calls while you're online.™ Pagoo Call Catcher™," Pagoo.com, Inc. website page, Mar. 3, 2000.

"pagoo™ The answer to missed calls while you're online.™ About Pagoo," Pagoo.com, Inc. website pp. 1–2, Mar. 3, 2000.

"pagoo™ The answer to missed calls while you're online.™ Services Overview," Pagoo.com, Inc. website page, Mar. 3, 2000.

"pagoo™ The answer to missed calls while you're online.™ Press Releases," Pagoo.com, Inc. website pp. 1–2, Mar. 6, 2000.

"Internet Call Manager. And you could answer the call! Never miss a call again while you're online!," GTE Internetworking website page, Mar. 3, 2000.

"Internet Call Manager. And you could answer the call! About Internet Call Manager," GTE Internetworking website pp. 1–2, Mar. 3, 2000.

"Internet Call Manager. Tired of missing phone calls while you're online? System Requirements," GTE Internetworking website page, Mar. 3, 2000.

"Internet Call Manager. And you could answer the call! Using Internet Call Manager," GTE Internetworking website pp. 1–3, Mar. 3, 2000.

"Internet Call Manager. And you could answer the call! Frequently Asked Questions," GTE Internetworking website pp. 1–4, Mar. 3, 2000.

Low, C., "The Internet Telephone Red Herring", HP Laboratories Technical Report, May 15, 1996, pp. 1–15.

* cited by examiner-

METHOD AND APPARATUS FOR ALLOWING SELECTIVE DISPOSITION OF AN INCOMING TELEPHONE CALL DURING AN INTERNET SESSION

BACKGROUND OF THE INVENTION

1. Field of the Invention

The present invention is directed to telephony and the internet, and more particularly, to a software tool for notifying an internet user of an incoming telephone call.

2. Background

The past several years have seen an explosive growth of the internet. Most of the increase in the popularity of the internet can be attributed to the information content available through the World Wide Web (the "Web"). The Web is built around a network of "server" computers which exchange requests and data from each other using the hypertext transfer protocol ("HTTP"). The Web consists of Web "pages" designed by a human designer using the Hypertext Markup Language ("HTML"). Each Web page contains graphical and text information. A new page may be accessed from the current page via a "hyperlink."

A user views a Web page using one of a number of commercially available "browser" programs. The browser submits an appropriate HTTP request to establish a communications link with a Web server on the network. A typical HTTP request references a Web page by its unique Uniform Resource Locator ("URL"). A URL identifies the Web server hosting that Web page, so that an HTTP request for access to the Web page can be routed to the appropriate Web server for handling.

A user requests internet access by subscribing to an Internet Service Provider ("ISP"). The ISP owns one or more internet server computers and provides access to other server computers for its subscribers. A user may connect to an ISP server in many ways, but the most common connection method is via a computer modem over conventional analog telephone lines. The user initiates a connection by dialing an ISP-provided access number from within a communications application, usually provided by the ISP. The application transmits user-provided data, such as a user name and password, over the user's computer modem to an application on the server computer. The server computer application confirms the user name and password and provides access to other internet servers. The user's communications application can then launch other internet applications, such as a Web browser.

While connected to the internet, however, the user may not receive any telephone calls over the analog telephone line. With the average internet user connected for over thirty minutes, internet users can frequently miss many important telephone calls. Call Waiting services do not provide an adequate solution to this problem. A user who subscribes to Call Waiting receives neither a visual nor an aural indication of an incoming telephone call. Moreover, many subscribers must disable the Call Waiting service because the Call Waiting transaction (usually one or two beeps) interrupts the user's modem connection to the internet, usually dropping the call.

Other current options available to the user are similarly inadequate. For instance, the user may subscribe to a voice mail service. But such services do not provide an indication to the user that a call and voicemail message were received. In addition, many voicemail services do not answer telephone calls received on a busy line. The user may also elect to purchase a second analog telephone line exclusively reserved for internet use. In most instances, however, the relatively brief time spent on the internet does not warrant the accompanying installation and monthly telephone service costs.

SUMMARY OF THE INVENTION

The present invention overcomes the problems and disadvantages of the prior art by storing the telephone number and internet protocol address of a user in the course of initiating an internet session. The stored information may be used to locate the user on the internet and notify her of an incoming telephone call. The invention also provides the user with information about the caller, such as the caller's name, street address, and telephone number. The internet user may then decide to: (1) ignore the call and continue working within the internet application; (2) accept the call and terminate the internet session, or (3) configure the incoming call as an internet telephony call so the internet session can continue.

In particular, in a preferred embodiment of the present invention, internet call notification software stored on an internet user's computer and advanced intelligent network software stored in a telephone network cooperatively notify the internet user of an incoming telephone call. The internet user sets the browser "home page" to the location of the internet notification software. The software then prompts the user, within the browser to activate the internet call notification. If the user requests notification, first an internet protocol ("IP") address is assigned by the user's internet service provider. Next, the software transmits the assigned IP address to the network using TCP/IP networking. The telephone network stores the IP address together with the user's telephone number in a database. When a subsequent telephone call is made to the user, the network accesses the database to determine if the user has an active internet session and, if so, to retrieve the IP address of the user. The telephone network then sends a message via the internet to the user's call notification software at the retrieved IP address. The personal computer software then displays a window providing information about the call, such as the calling party's name and telephone number along with options for the disposition of the telephone call. The user may elect to accept the telephone call or reject the call. If the user accepts the telephone call, the software closes the browser and connects the call to the user's telephone line. If the user rejects the telephone call, the software informs the network that the user has rejected the call. The network may then allow the call to ring on the calling party's end. Alternatively, the call may be forwarded to a specified alternate telephone number for the user.

In accordance with the purpose of the invention, as embodied and broadly described herein, the invention is a method for notifying an internet user of an incoming telephone call from a calling party, the method comprising the steps of storing an internet protocol address of the user; receiving the incoming telephone call; retrieving the stored internet protocol address of the user; sending a message to the internet protocol address; displaying information regarding the telephone call; and providing options to the internet user for the disposition of the call.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

DETAILED DESCRIPTION OF THE PREFERRED EMBODIMENT

Reference will now be made in detail to a preferred embodiment of the invention, examples of which are illustrated in the accompanying drawings. Wherever possible, the same reference numbers will be used throughout the drawings to refer to the same or like parts.

Figure 1:
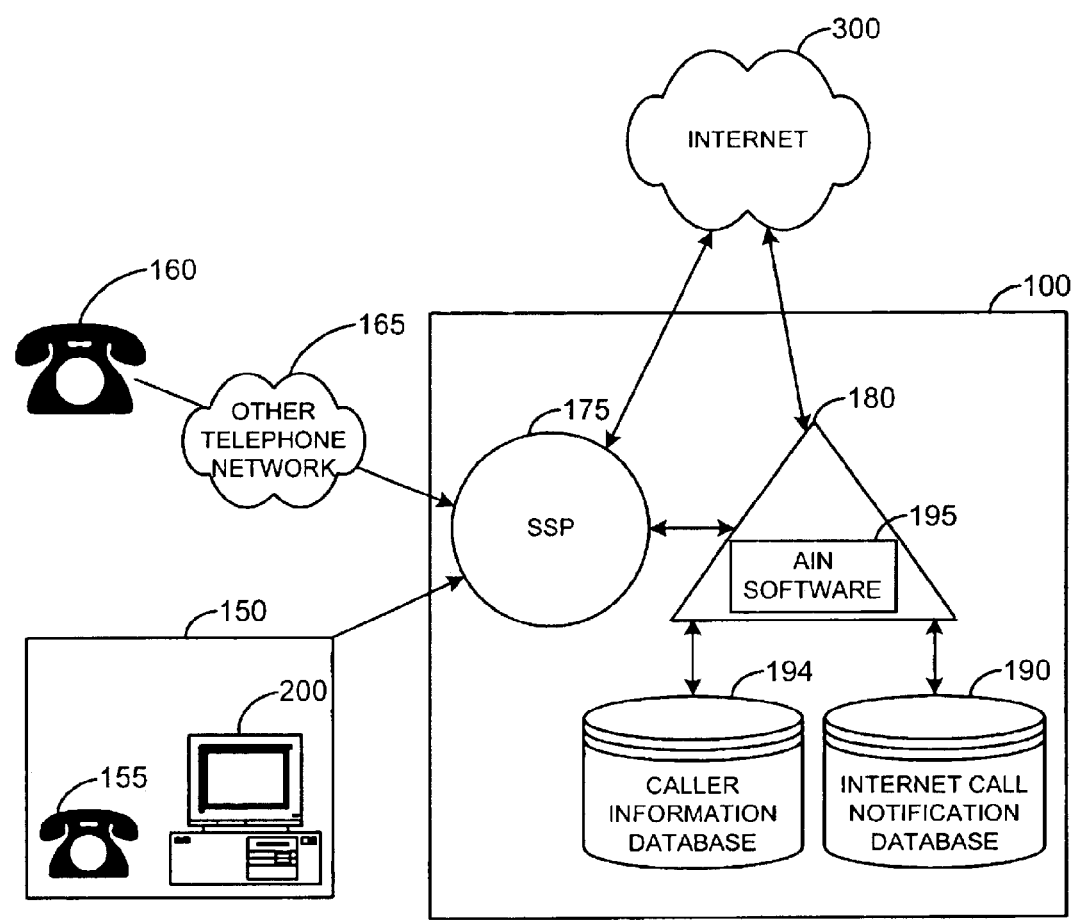
FIG. 1 is a block diagram of an exemplary telephone network, in accordance with a preferred embodiment of the present invention.

FIG. 1 is a block diagram of an exemplary advanced intelligent network ("AIN") network 100 interconnected via Signaling System #7 ("SS7"), in accordance with a preferred embodiment of the present invention. AIN functionality is described in described in Bellcore Documents No. GR-1298-CORE and GR-1299-CORE, which are both hereby incorporated by reference herein SS7 signaling is described in detail in "American National Standard for Telecommunications—Signaling System Number 7, Nos. T1.110 through T1.116", which is hereby incorporated by reference herein. A calling party 160 and a called party/internet user 150 have access to the network 100. The called party 150 connects to the network 100 using either a standard telephone 155 or through a computer 200. The computer 200 connects to the network 100 by a computer modem 267 or a similar device. Both the modem 267 and the telephone 155 are coupled to a network connector on the user's premises, such as a telephone jack (not shown). A service switching point ("SSP") 175 switches calls to and from the internet user 150. The SSP may be located, for instance, in an end office coupled to the internet user's telephone jack.

The SSP 175 is communicatively coupled to an Advanced Intelligent Network Service Control Point ("AIN SCP") 180 or similar SS7-compatible device. The SSP 175 and AIN SCP 180 communicate via SS7 messaging and TCAP queries. TCAP queries are described in Bellcore Document No. GR-1298-CORE entitled "AIN GR: Switching Systems", Issue 3, Rev. November 1996, which is hereby incorporated by reference herein. The AIN SCP 180 accesses one or more databases, including an Internet Call Notification ("ICN") database 190 (discussed in greater detail below) and a caller information database 194. The AIN SCP stores information and accesses the ICN database 190 for ICN-related information. The caller information database contains information regarding individual callers, such as names, street addresses, and telephone numbers of subscribers and nonsubscribers to the network. The user PC 200 (through the SSP 175) and the AIN SCP 180 are both communicatively coupled to the internet 300 using Transmission Control Protocol/Internet Protocol (TCP/IP) networking.

Figure 2:
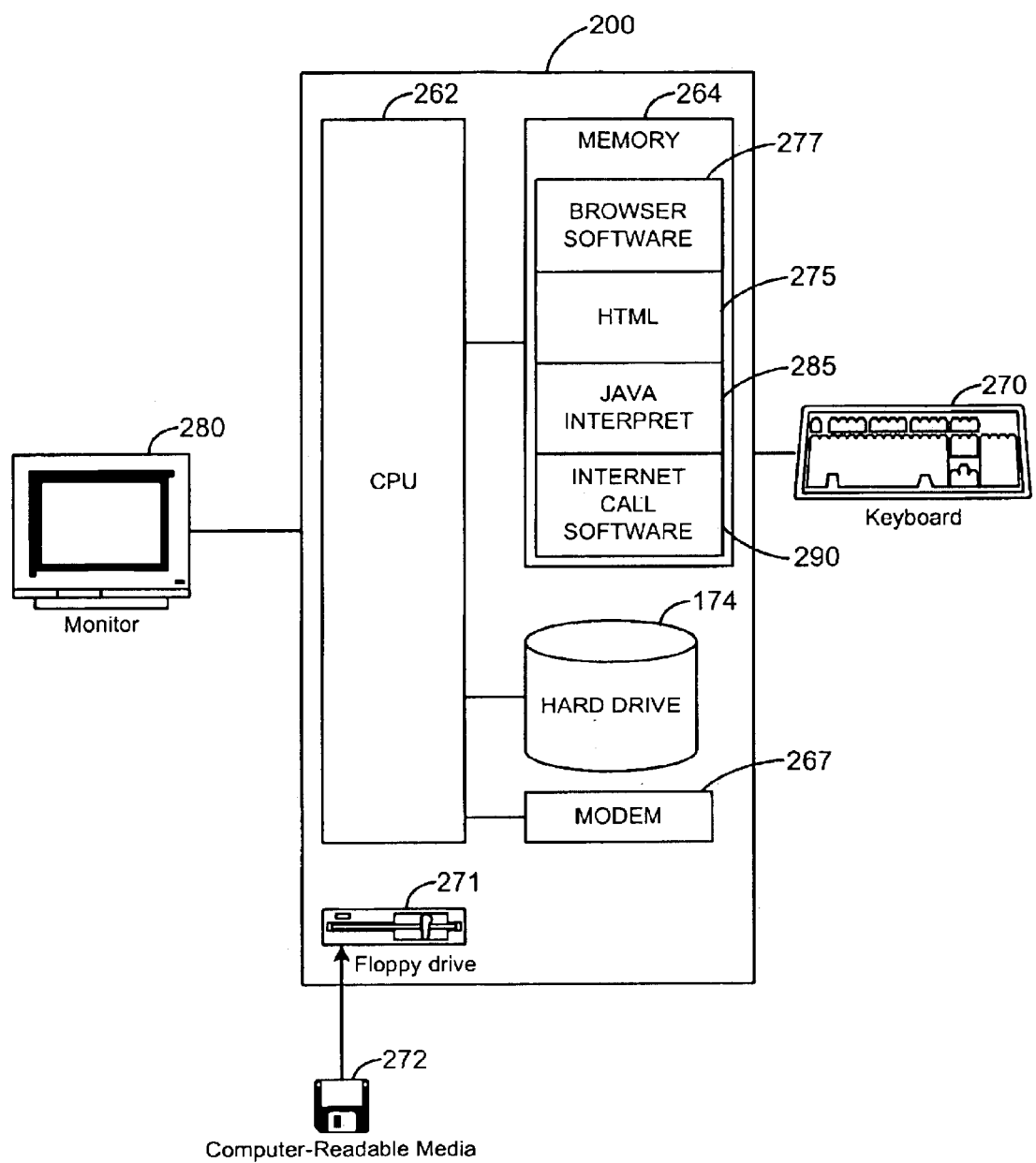
FIG. 2 is a block diagram of a computer, in accordance with a preferred embodiment of the present invention.

FIG. 2 is a block diagram of computer 200, in accordance with a preferred embodiment of the present invention. Computer 200 includes a CPU 262; a memory 264; input/output lines 265; a modem 267; an input device 270, such as a keyboard or mouse; and a display device 280, such as a display terminal. Computer 260 also includes an removable storage device 271, such as a disk drive, that reads computer instructions stored on computer readable media 272, such as a computer disk. Memory 264 of computer 260 includes browser software 277, such as the browser sold under the trademark "Netscape Navigator" by Netscape Communications, Inc., although other browsers may be used. Memory 264 also includes a computer display control language, such as the Hypertext Markup Language ("HTML") 275 and a Java interpreter 285. Browser software 277 may also include a plug-in that interprets the Java language or otherwise provides access to the internet call notification software described below. A person of ordinary skill in the art will understand that memory 264 also contains additional information, such as application programs, operating systems, data, etc., which are not shown in the figure for the sake of clarity.

The present invention includes two components: (1) an Internet Call Notification ("ICN") software component 290 stored on a local disk drive of computer 200 and read into memory 264 upon execution; and (2) an AIN software component 195 stored in AIN SCP 180 and associated databases 190, 194. The ICN component 290 and the AIN component 195 work together to provide notification to the internet user 200 of an incoming call. To ensure that the two components function properly, the internet user 200 pre-registers with his local exchange carrier ("LEC") for his service area.

Service Activation

Prior to use, the user 150 may configure the ICN software component 290 by specifying one or more default telephone numbers. For example, the user 150 may specify a cellular telephone number, a pager device number, and/or a voice-mail telephone number. During execution, the user selects one of the specified numbers for default handling of telephone calls during an internet session. The user interface may include methods to simplify the selection of the number to be used.

Figure 3:
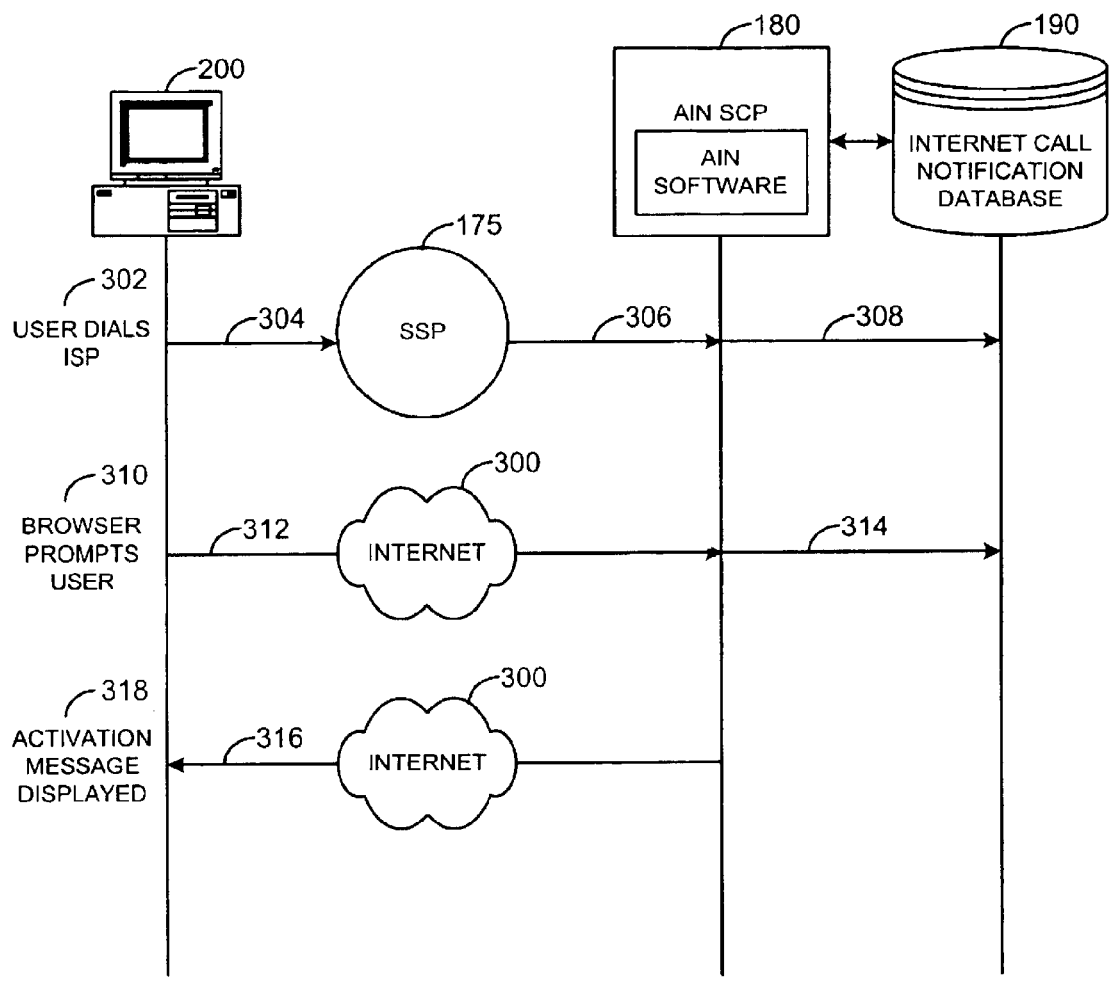
FIG. 3 is a flow chart illustrating the interaction between a calling party, internet call notification software, and AIN software.

FIG. 3 is a flow diagram illustrating the flow of data between internet user 200, ICN software 290, and AIN SCP 180 and its associated databases. It will be understood by persons of ordinary skill in the art that the steps of flow charts in this document are performed by CPU 262 of FIG. 1 executing the instructions of software 290 and a processor in AIN SCP 180. In step 302, the internet computer 200 initiates an internet session by dialing a remote server or point of presence ("POP") operated by the ISP. The dialed number includes a feature code dialing sequence, such as *99. In step 304, modem 267 sends calling digits of the remote server to SSP 175. The SSP 175 will automatically receive the telephone number of the internet user 150. An AIN feature code trigger is invoked in the SSP 175 and a resulting Info-Analyzed message is sent to the AIN SCP 180. Based on the dialed feature code, in step 306, the AIN SCP 180 creates an internet call entry 410 in the ICN database 190.

Figure 4:
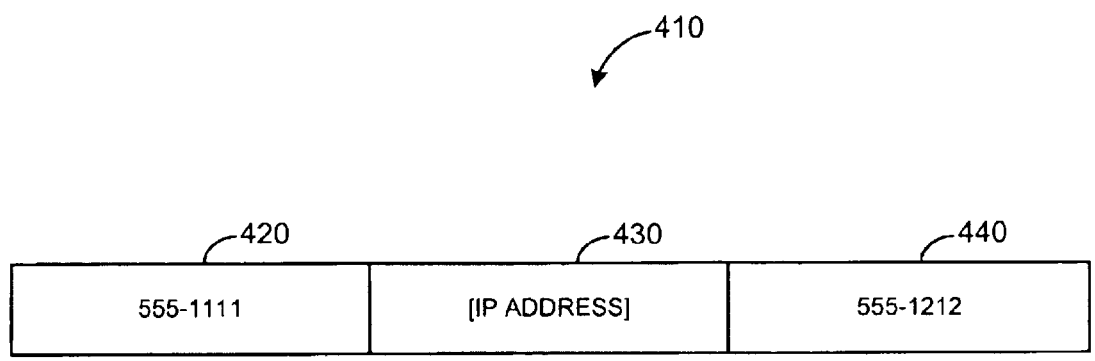
FIG. 4 is an illustration of an internet notification database entry.

An example of the internet call entry 410 is shown in FIG. 4. The entry 410 includes a field 420 specifying the user's telephone number, a field 430 specifying the internet address of the user, and a field 440 specifying a default telephone number of the user, if available. The SSP 175 provides data for field 420. The internet address fields 430, 440 are left blank until the user has been assigned an internet address and requests activation of Internet Call Notification.

Once connected to the ISP server, the ISP assigns the user 200 an Internet Protocol ("IP") address to identify the user to other hosts on the Internet. The user 200 may then open browser software 277. Browser software 277 displays HTML and Java pages specified by HTTP requests. In addition, browser software 277 can display other HTML and Java documents located on the user's computer. Browser software allows the user to specify a "home page" as the initial document to be displayed by the browser software 277. In the present invention, the user sets the home page address as the local disk drive location of ICN software program 290 (e.g., "C:\ICN\ICN.EXE"). The ICN software program 290 is an executable stand-alone program or browser "plug-in" written in a programming language, such as the JAVA programming language. JAVA is a registered trademark of Sun Microsystems, Inc. JAVA programming is described in detail in The Waite Group's "Java Primer Plus," by Paul M. Tyma, Gabriel Torok, and Troy Downing (1996) which is incorporated by reference herein.

In step 310, the ICN software 290 causes the computer 200 to display a window that prompts the user to activate Internet Call Notification. The window includes a menu of pre-arranged option buttons. The user 200 may choose to be notified by selecting a "Yes" button in the window. If the user does not want to be notified of incoming calls, the user may select a "No" button in the window. The user may also specify one of the several default telephone numbers that were provided during configuration of the software. If the user 200 selects call notification, the ICN program 290 creates a data message, such as a User Datagram Protocol ("UDP") packet containing: (1) the user's current IP address; (2) the user's telephone number; and (3) the default telephone number. In step 312, the packet is sent directly to the AIN SCP 180 by the ICN software 290 using a domain name server that maps to a physical address for the AIN SCP 180. The AIN SCP 180 receives the data message and, in step 314, completes the database entry 310 by entering the user's IP address in the field 430, and the default telephone number in the field 440. The AIN SCP 180, in step 316, returns a confirmation message back to the user 200 over the Internet. In step 318, ICN software 290 causes browser 277 to display a message confirming activation of ICN.

Internet Call Notification and Disposition

Figure 5:
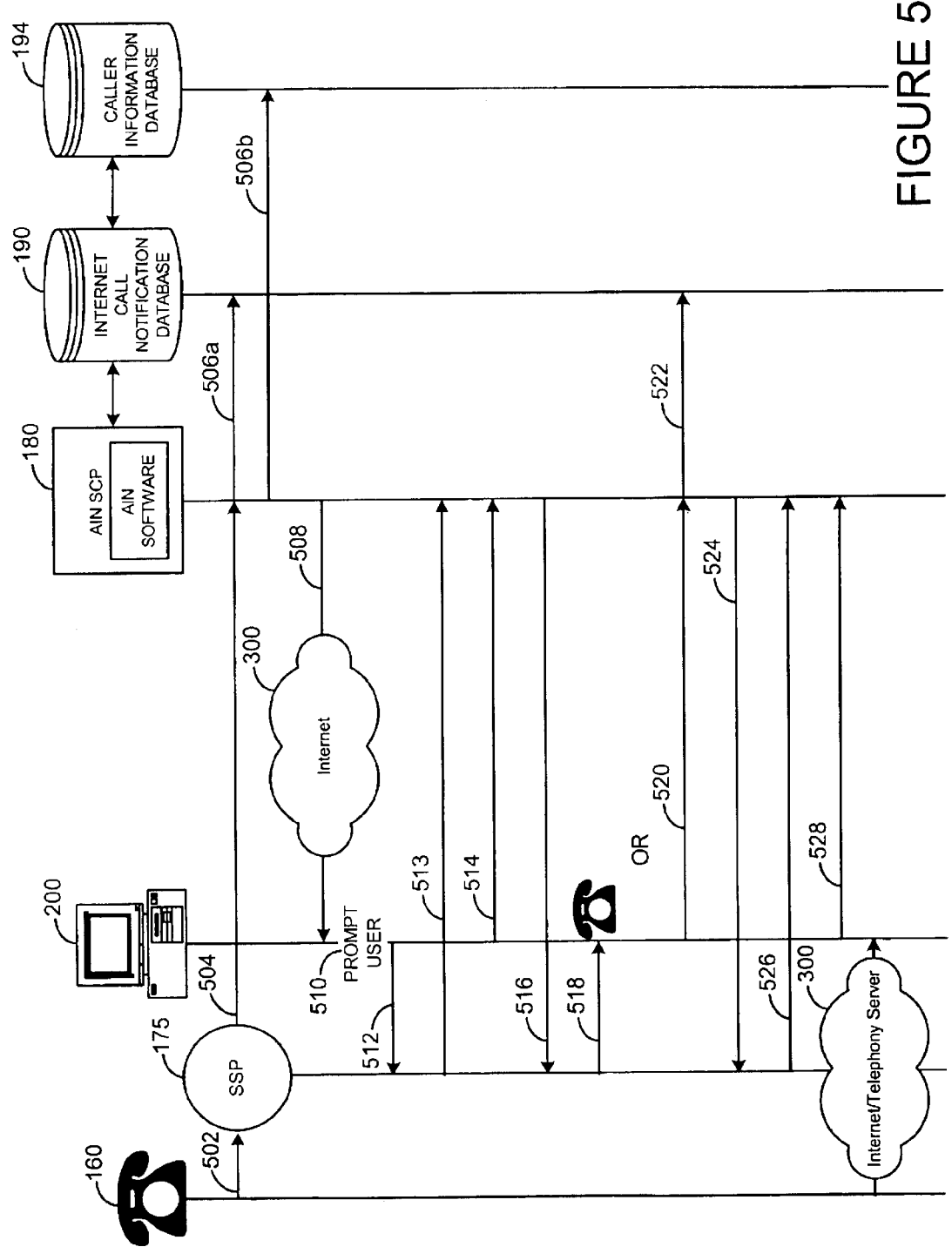
FIG. 5 is a flow chart illustrating the interaction between calling party, internet call notification software and AIN software.

FIG. 5 is a flow chart illustrating the interaction between calling party 160, ICN software 290 and AIN software 195. In step 502, a calling party 160 dials internet user 150. A telephone call by the calling party 160 to the user 150 will encounter an AIN trigger, such as the terminating busy trigger, in the SSP 175 prior to reaching the user's line. The terminating busy trigger captures a call to a busy telephone line without allowing the caller to hear a busy signal. The trigger is placed before a call waiting feature or any other terminating feature. Upon capturing the call, the SSP 175, in step 504, sends a TCAP query to the AIN SCP 180 for instructions regarding disposition of the telephone call. The AIN SCP 180 IN STEP 506a accesses the ICN database 190 and concludes that the user has an active internet session. The AIN SCP 180 then retrieves the IP address for the user from the IP address field 430 of the database entry 410. In addition, the AIN SCP 180, in step 506b, accesses the caller information database 194 to retrieve information regarding the calling party, if available. In step 508, the AIN SCP 180 sends a data message containing the calling party information to the user at the user's internet address. The message notifies the ICN software 290 of an incoming call.

The ICN software 290, in step 510, causes the computer 200 to display a window informing the user that a call is incoming and presenting the user with caller information. The window prompts the user to accept the call directly, to accept the call over the internet using computer telephony, or to ignore the call. If the user elects to accept the telephone call directly, the software 290, in step 512, terminates the connection between the modem and the ISP server. In step 513, the software 290 sends a call termination indication directly to the AIN SCP 180 using TCP/IP networking protocol. In addition, the SSP 175 sends a disconnect message to the AIN SCP 180 in step 514. The termination of the call and modem session are received by the SSP 175. The user's telephone line is then free to accept telephone calls. Based on the notification that the user has disconnected the telephone call, the AIN SCP 180, in step 516, sends an AIN TCAP message to the SSP 175, instructing the SSP 175 to complete the call from the calling party 160 to the user 200. In step 518, the user answers the call from calling party 170.

If the user elects not to accept the call at step 510, call flow continues at step 520. In step 520, the ICN software 290 either notifies the AIN SCP 180 that the user has chosen to ignore the call or the software 290 times out. In step 522, AIN SCP 180 accesses database 190 to determine the default telephone number specified by the user at start-up. In step 524, AIN SCP 180 sends a TCAP message instructing SSP 175 to route the telephone call from calling party 170 to the default telephone number received in step 522. If no answer is received at the specified telephone number, other default processing may be performed.

If the user elects to accept the call using internet telephony, the user must specify a telephony server IP address. In step 524, the address is transmitted back to the AIN SCP 180. The AIN SCP 180 then establishes a connection with the telephony server. Once the connection is established, the AIN SCP 180 provides the user's IP address to the server together with information about the calling party. The server may then connect the calling party 160 and the internet user 150.

Service Deactivation

Once the user has concluded the internet session, the termination of the call is recognized by the SSP 175. This event causes the SSP 175 to send a call termination notification message to the AIN SCP 180. The AIN SCP 180 then removes the user's entry from the ICN database 190, effectively deactivating the ICN session.

Having thus described a preferred embodiment of a method and apparatus for notifying an internet user of an incoming telephone call, it should be apparent to those skilled in the art that certain advantages have been achieved. It should also be appreciated that various modifications, adaptations, and alternative embodiments thereof, may be made within the scope and spirit of the present invention. For example, while the calling party 160 is waiting for the connection to the called party 150, the AIN SCP 180 may send a "HOLD" message back to the SSP 175. The "HOLD" message may instruct the SSP 175 to play a particular announcement and to hold the call until the user 150 has been disconnected from the network. The invention is further defined by the following claims.

What is claimed is:

1. A method for notifying an internet user of an incoming telephone call from a calling party, the method comprising:
   storing an internet protocol address of the user in association with a telephone number of the user;
   receiving a telephone call for the telephone number of the user at a switch;
   maintaining control of the telephone call at the switch;
   determining the user is in an active internet session; and
   if the user is in an active internet session, then
      using the telephone number of the user to retrieve the internet protocol address of the user; and
      sending a message to the internet protocol address.

2. The method for notifying an internet user of an incoming telephone call, as recited in claim 1, further comprising:
   prompting the user to perform at least one of the following actions:
   accepting the telephone call directly;
   ignoring the telephone call; and
   accepting the telephone call over the internet.

3. The method for notifying an internet user of an incoming telephone call, as recited in claim 2, further comprising:
   terminating an internet session if the user elects to accept the telephone call directly; and
   connecting the telephone call from the calling party to the user.

4. The method for notifying an internet user of an incoming telephone call, as recited in claim 2, further comprising:
   storing a default telephone number of the user; and
   connecting the telephone call from the calling party to the default telephone number if the user elects to ignore the telephone call.

5. The method for notifying an internet user of an incoming telephone call, as recited in claim 2, further comprising sending the internet protocol address of the user to a telephony server if the user elects to accept the telephone call over the internet.

6. The method for notifying an internet user of an incoming telephone call, as recited in claim 1, further comprising:
   displaying a web page;
   prompting the user to activate call notification from the web page;
   transmitting the internet address of the user if the user elects to activate call notification; and
   displaying a service activation message in the web page.

7. The method for notifying an internet user of an incoming telephone call, as recited in claim 1, further comprising displaying information regarding the telephone call, wherein the information regarding the telephone call includes information regarding the calling party.

8. The method for notifying an internet user of an incoming telephone call, as recited in claim 1, wherein the internet address is stored by a service control point.

9. The method for notifying an internet user of an incoming telephone call, as recited in claim 8, wherein the service control point stores the internet address in a database.

10. The method for notifying an internet user of an incoming telephone call, as recited in claim 1, wherein storing an internet protocol address of the user comprises:
    receiving a feature code as part of an initiation of an internet session by the user;
    in response to receiving the feature code, creating an entry for storing the internet protocol address of the user; and
    receiving the internet protocol address of the user.

11. A method, performed by a computer processor, for notifying an internet user of an incoming telephone call from a calling party, the method comprising:
    displaying a web page, containing a prompt to the user requesting activation of internet call notification;
    receiving an indication of a selection of the prompt from the user;
    in response to receiving the indication of the selection of the prompt, activating internet call notification; and
    transmitting the user's internet protocol address to a telephone network element.

12. The method for notifying an internet user of an incoming telephone call, as recited in claim 11, further comprising:
    receiving a message containing information respecting the telephone call; and
    displaying a window notifying the user of the telephone call.

13. The method for notifying an internet user of an incoming telephone call, as recited in claim 12, further comprising:
    receiving a request from the user to connect the telephone call;
    ending an internet session of the user; and
    connecting the telephone call from the calling party to the user.

14. The method for notifying an internet user of an incoming telephone call, as recited in claim 12, wherein the information respecting the telephone call includes information regarding the calling party.

15. The method for notifying an internet user of an incoming telephone call, as recited in claim 11, further comprising:
    receiving a feature code as part of an initiation of an internet session by the user; and
    in response to receiving the feature code, creating an entry for storing the internet protocol address of the user in the telephone network.

16. A system for notifying an internet user of an incoming telephone call from a calling party, the system comprising:
    a service switching point configured to receive and maintain control of the telephone call from the calling party and to send a message regarding the telephone call; and
    a service control point configured to store an internet protocol address of the user when the user is in an active internet session, to receive the message regarding the telephone call from the service switching point, and to send an internet notification message to the internet protocol address of the user; and
    the service control point also configured to remove the internet protocol address of the user when the user concludes the active internet session.

17. The system, as recited in claim 16, further comprising an internet notification means for displaying information respecting the telephone call, based upon the internet notification message, to the user, wherein the internet notification means further comprises:
    means for causing the internet browser to prompt the user to accept the telephone call;
    means for terminating a session of the internet browser if the user elects to accept the telephone call; and
    means for connecting the telephone call from the calling party to the user.

18. The system, as recited in claim 16, wherein the system further comprises:

an internet notification means for displaying information respecting the telephone call, based upon the internet notification message, to the user;

means for storing a default telephone number of the user;

means, within the internet notification means, for prompting the user to accept the telephone call; and means for connecting the telephone call from the calling party to the default telephone number of the user if the user does not elect to accept the telephone call.

19. The system, as recited in claim 16, further comprising an internet notification means for displaying information respecting the telephone call, based upon the internet notification message, to the user, and wherein the internet notification means further comprises:

means for prompting the user to activate call notification;

means for transmitting the internet address of the user if the user elects to activate call notification; and means for displaying a service activation message.

20. The system, as recited in claim 16, further comprising an internet notification means for displaying information respecting the telephone call, based upon the internet notification message, to the user, and wherein the internet notification means further comprises:

means for displaying a web page in the internet browser;

means for prompting the user to activate call notification from the web page;

means for transmitting the internet address of the user if the user elects to activate call notification; and means for displaying a service activation message in the web page.

21. The system, as recited in claim 16, further comprising an internet notification means for displaying information respecting the telephone call, based upon the internet notification message, to the user, and wherein the information respecting the telephone call includes information regarding the calling party.

22. The apparatus for notifying an internet user of an incoming telephone call, as recited in claim 16, wherein the service switching point is configured to receive a feature code as part of an initiation of an internet session by the user, and to transmit the feature code to the service control point;

wherein the service control point, is configured, in response to receiving the feature code, to create an entry for storing the internet protocol address of the user.

23. With respect to a user interested in engaging in an internet session on a telecommunications line associated with a telephone number without the user having to miss a call directed to the telephone number, a method for setting up a call indication service during the internet session of the user, the method comprising:

receiving information including a feature code relating to an initiation of an internet session by the user on the telecommunications line associated with the telephone number, the information including the telephone number of the user;

in response to receiving the information, creating an entry for storing the telephone number of the user;

receiving an internet protocol (IP) address for the user, the IP address for delivery of communications to the user on the telecommunications line associated with the telephone number during the internet session initiated by the user; and storing the IP address in association with the telephone number of the user, whereby the call indication service is set up for the user through the receipt and storage in association of the telephone number and the IP address of the user so that a telephone call directed to the telephone number may be brought to the user's attention by a communication delivered to the IP address of the user.

24. The method of claim 23, wherein the information comprises calling digits, the calling digits relating to an element of a service provider providing the user with internet service for the internet session; and wherein receiving the information comprises receiving the calling digits.

25. The method of claim 23, wherein receiving the information relating to the initiation of the internet session by the user comprises receiving the information through the telephone network.

26. The method of claim 23, wherein receiving the IP address for the user comprises receiving the IP address for the user via the internet.

27. The method of claim 23, further comprising: after the initiation of the internet session by the user, receiving an indication of interest by the user in activating the call indication service for the internet session.

28. The method of claim 27, wherein receiving the indication of the interest by the user in activating the call indication service for the internet session precedes receiving the IP address for the user.

29. The method of claim 27, wherein receiving the indication of the interest by the user in activating the call indication service for the internet session comprises a basis for receiving the IP address for the user.

30. With respect to a user interested in engaging in an internet session on a telecommunications line associated with a telephone number without the user having to miss a call directed to the telephone number, the user being assigned an internet protocol (IP) address for use in the internet session, a method for providing a call indication service during the internet session of the user, the method comprising:

A. upon initiation of the internet session by the user, receiving the telephone number of the user and the IP address assigned to the user, and storing the telephone number in association with the IP address;

B. in response to receiving the call directed to the telephone number, maintaining control of the call at a switch and using the telephone number 1. to determine the user is engaged in an internet session on the telecommunications line associated with the telephone number, and 2. if the user is engaged in the internet session, then to retrieve the IP address assigned to the user and stored in association with the telephone number of the user; and C. sending a message regarding the call to the user using the IP address so the message is presented to the user in the internet session, whereby the user is provided with the call indication service on the basis of the telephone number of the user being used to determine the user is engaged in the internet session and to retrieve the IP address assigned to the user for sending the message regarding the call to the user.

31. The method of claim 30, wherein the IP address assigned to the user and the telephone number of the user are stored in association based on receiving a feature code in the initiation of the internet session by the user.

32. The method of claim 30, wherein receiving the call directed to the telephone number comprises receiving the call through the telephone network.

33. The method of claim 30, wherein action B of using the telephone number comprises using the telephone number in an element of the telephone network to determine the user is engaged in the internet session and to retrieve the IP address.

34. The method of claim 30, wherein sending the message regarding the call to the user using the IP address comprises sending the message from an element of the telephone network via the internet to the user.

* * * * *